United States Patent
Chiang et al.

(10) Patent No.: US 12,410,833 B2
(45) Date of Patent: Sep. 9, 2025

(54) FOLDABLE ELECTRONIC DEVICE

(71) Applicant: ASUSTeK COMPUTER INC., Taipei (TW)

(72) Inventors: Tsung-Ju Chiang, Taipei (TW); Yung-Hsiang Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 305 days.

(21) Appl. No.: 18/306,212

(22) Filed: Apr. 24, 2023

(65) Prior Publication Data

US 2024/0117837 A1 Apr. 11, 2024

(30) Foreign Application Priority Data

Oct. 7, 2022 (TW) ................................. 111211031

(51) Int. Cl.
*G06F 1/16* (2006.01)
*F16C 11/04* (2006.01)

(52) U.S. Cl.
CPC ............ *F16C 11/04* (2013.01); *G06F 1/1616* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 11,359,425 B2* | 6/2022 | Chang | ........................ | E05D 3/18 |
| 11,775,029 B2* | 10/2023 | Yuan | ........................ | G06F 1/181 |
| | | | | 361/679.27 |
| 11,782,487 B2* | 10/2023 | Shen | ...................... | G06F 1/1681 |
| | | | | 361/679.27 |
| 11,797,061 B2* | 10/2023 | Hazama | ................ | G06F 1/1681 |
| 11,924,987 B2* | 3/2024 | Lee | ........................ | H04M 1/022 |
| 11,927,991 B2* | 3/2024 | Torres | ....................... | E05D 3/16 |
| 11,983,045 B2* | 5/2024 | Lin | ........................ | G06F 1/1681 |
| 12,108,551 B2* | 10/2024 | Jung | .................... | H05K 5/0226 |
| 12,117,877 B2* | 10/2024 | Zhang | ................. | H04M 1/0216 |
| 12,124,293 B2* | 10/2024 | Chen | ..................... | G06F 1/1675 |
| 12,204,380 B2* | 1/2025 | Park | ........................ | G06F 1/1618 |
| 2018/0073613 A1* | 3/2018 | Chen | ....................... | F16H 25/18 |
| 2018/0119467 A1* | 5/2018 | Liu | ......................... | E05D 11/06 |
| 2022/0147112 A1* | 5/2022 | Yu | ........................... | F16C 11/04 |

FOREIGN PATENT DOCUMENTS

| | | |
|---|---|---|
| CN | 210830137 | 6/2020 |
| CN | 113124042 | 7/2021 |
| TW | I694214 | 5/2020 |

* cited by examiner

*Primary Examiner* — Imani N Hayman
*Assistant Examiner* — Rashen E Morrison
(74) *Attorney, Agent, or Firm* — JCIPRNET (57) ABSTRACT

A foldable electronic device includes a first body, a second body, a first hinge module, a second hinge module, a driving sheet, and a one-way bearing. The first body has a display surface and a back surface. The first hinge module has a first shaft pivotally connected to the first body and a second shaft pivotally connected to the second body. The second shaft has a virtual axis. The second hinge module is disposed to the second body and has a rotating shaft. The rotating shaft is disposed corresponding to the virtual axis. The driving sheet is located between the first shaft and the second shaft, and is located between the first hinge module and the second hinge module. The one-way bearing is rotatably disposed around the rotating shaft. The one-way bearing has a bearing stop portion corresponding to the driving sheet.

8 Claims, 8 Drawing Sheets

FOLDABLE ELECTRONIC DEVICE

CROSS-REFERENCE TO RELATED APPLICATION

This application claims the priority benefit of Taiwan application serial no. 111211031, filed on Oct. 7, 2022. The entirety of the above-mentioned patent application is hereby incorporated by reference herein and made a part of this specification.

BACKGROUND

Technical Field

The disclosure relates to an electronic device, and in particular relates to a foldable electronic device.

Description of Related Art

Generally speaking, in a 360-degree foldable electronic device, when the display body and the system body are unfolded and folded with each other, there may be various operation modes, such as a notebook computer mode, a tablet mode, a tent mode, and a drawing mode. Moreover, the torque provided by the hinge module pivotally connected between the display body and the system body is mostly constant, so that the display body and the system body may rotate smoothly during the unfolding and folding process.

However, in the drawing mode, the user often applies extra force to the display body to draw and write via touch control, such that the torque value originally set by the hinge module cannot support the force of drawing and writing via touch control. Alternatively, the torque of the hinge module needs to be increased, thereby making it difficult for the user to flip the electronic device in other modes.

SUMMARY

In this disclosure, a foldable electronic device, which includes a first body, a second body, a first hinge module, a second hinge module, a driving sheet, and a one-way bearing are provided. The first body has a display surface and a back surface. The first hinge module has a first shaft and a second shaft. The first shaft is pivotally connected to the first body. The second shaft is pivotally connected to the second body. The second shaft has a virtual axis. The second hinge module is disposed on the second body and has a rotating shaft. The rotating shaft is disposed corresponding to the virtual axis. The driving sheet is located between the first shaft and the second shaft. The driving sheet is located between the first hinge module and the second hinge module. The one-way bearing is rotatably disposed around the rotating shaft. The one-way bearing has a bearing stop portion corresponding to the driving sheet. When the first body is flipped relative to the second body, the driving sheet rotates to a first position along a first rotation direction and contacts the bearing stop portion, and drives the one-way bearing and the rotating shaft to rotate relative to the second body simultaneously, so that the back surface faces the second body.

Based on the above, in the foldable electronic device of this disclosure, the first body is rotated 360 degrees relative to the second body through the first hinge module, and through the structural design of the second hinge module, the driving sheet, and the one-way bearing, such that the second hinge module in the drawing mode provides additional torque only after the first body rotates relative to the second body along the first rotation direction and unfolds to a first angle (i.e., the driving sheet rotates to the first position along the first rotation direction to contact the bearing stop portion). Therefore, in the drawing mode, the foldable electronic device supports the force of the hand drawing and writing via touch control applied along the first rotation direction, and prevents the user from feeling difficulty in flipping the electronic device in other modes caused by the increase of the torque value.

DETAILED DESCRIPTION OF DISCLOSED EMBODIMENTS

Figure 1A:
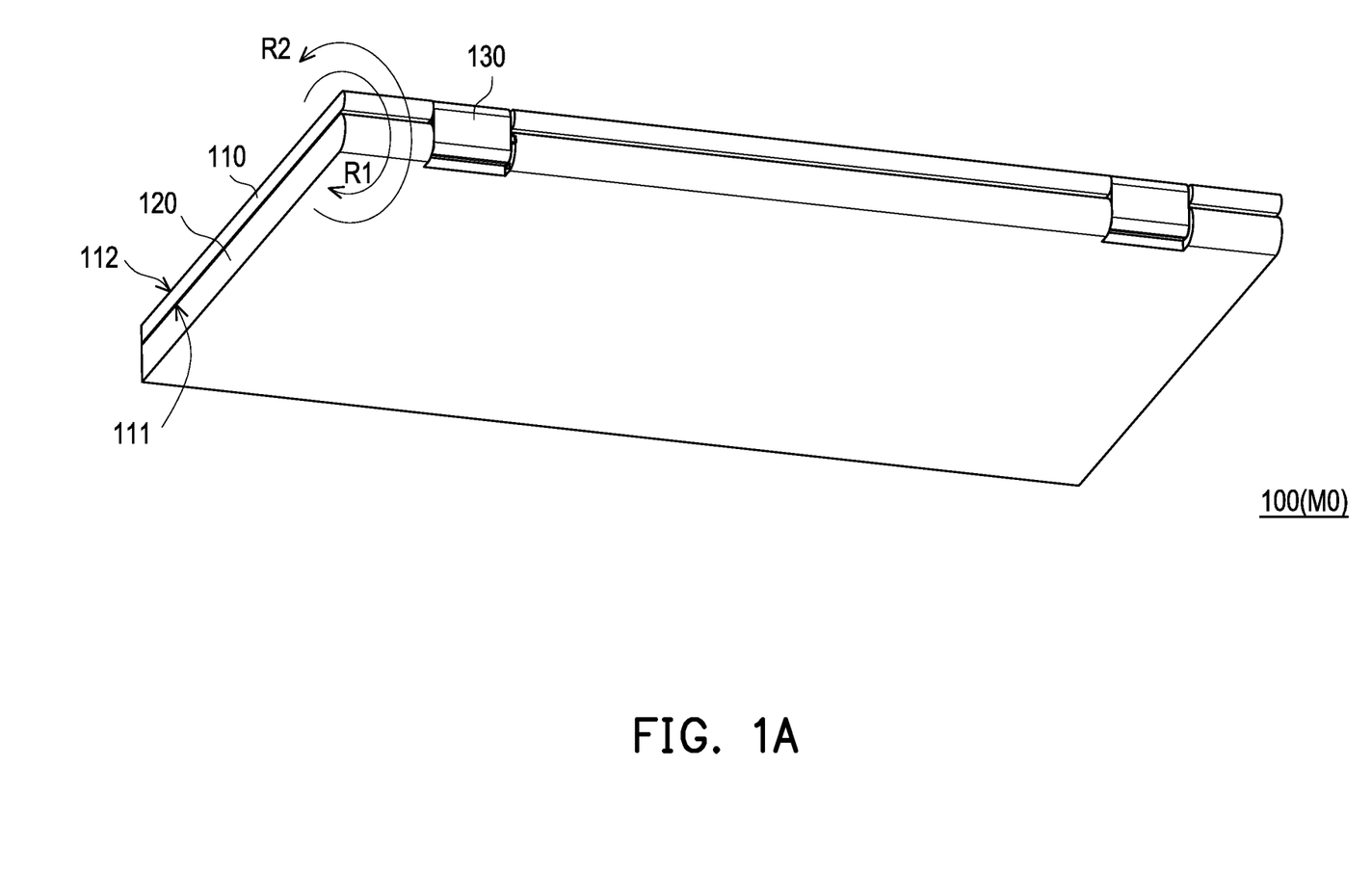
FIG. 1A to FIG. 1C are three-dimensional views of a foldable electronic device in a folding mode, a drawing mode, and a tablet mode of an embodiment of the disclosure.
Figure 1B:
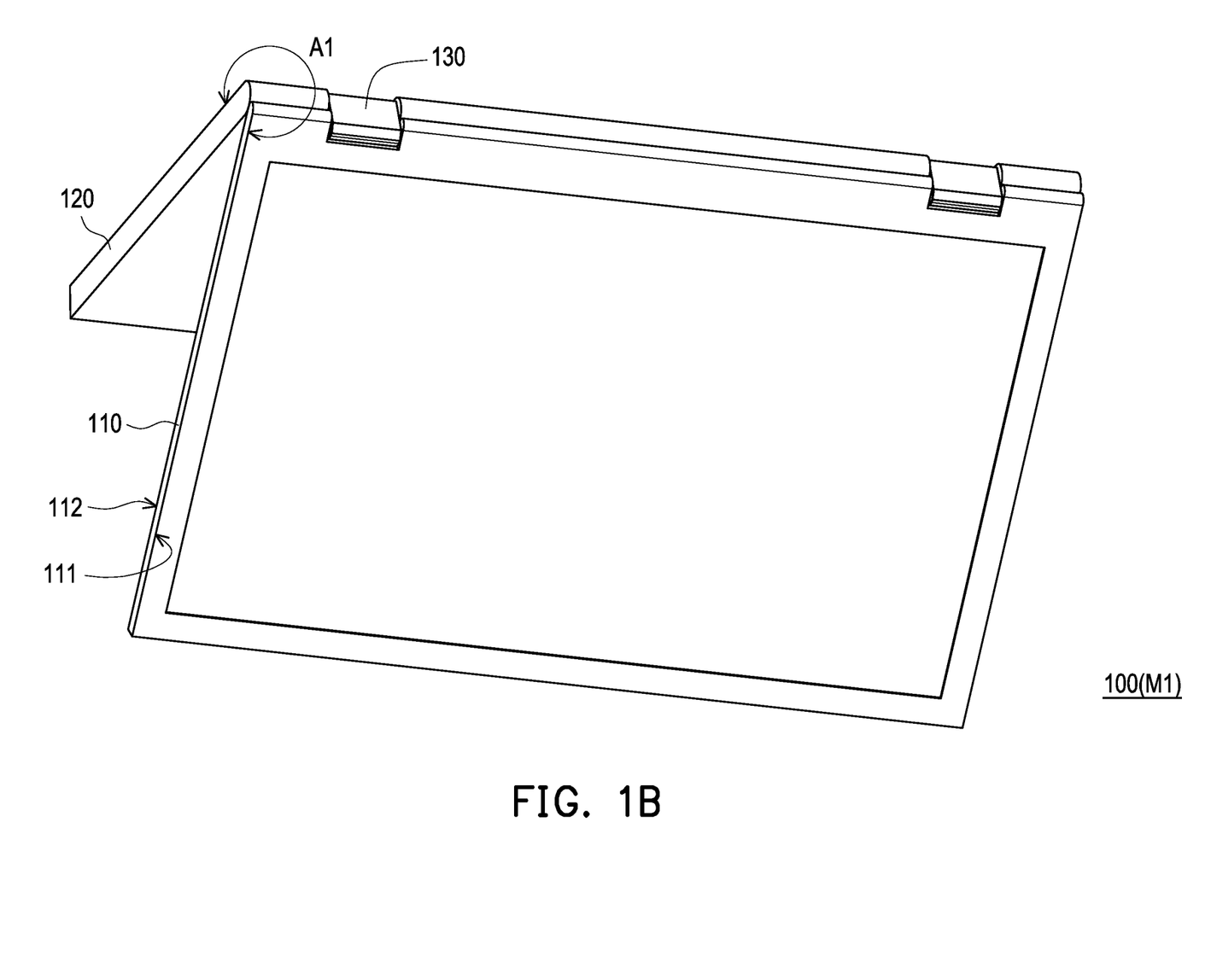
Figure 1C:
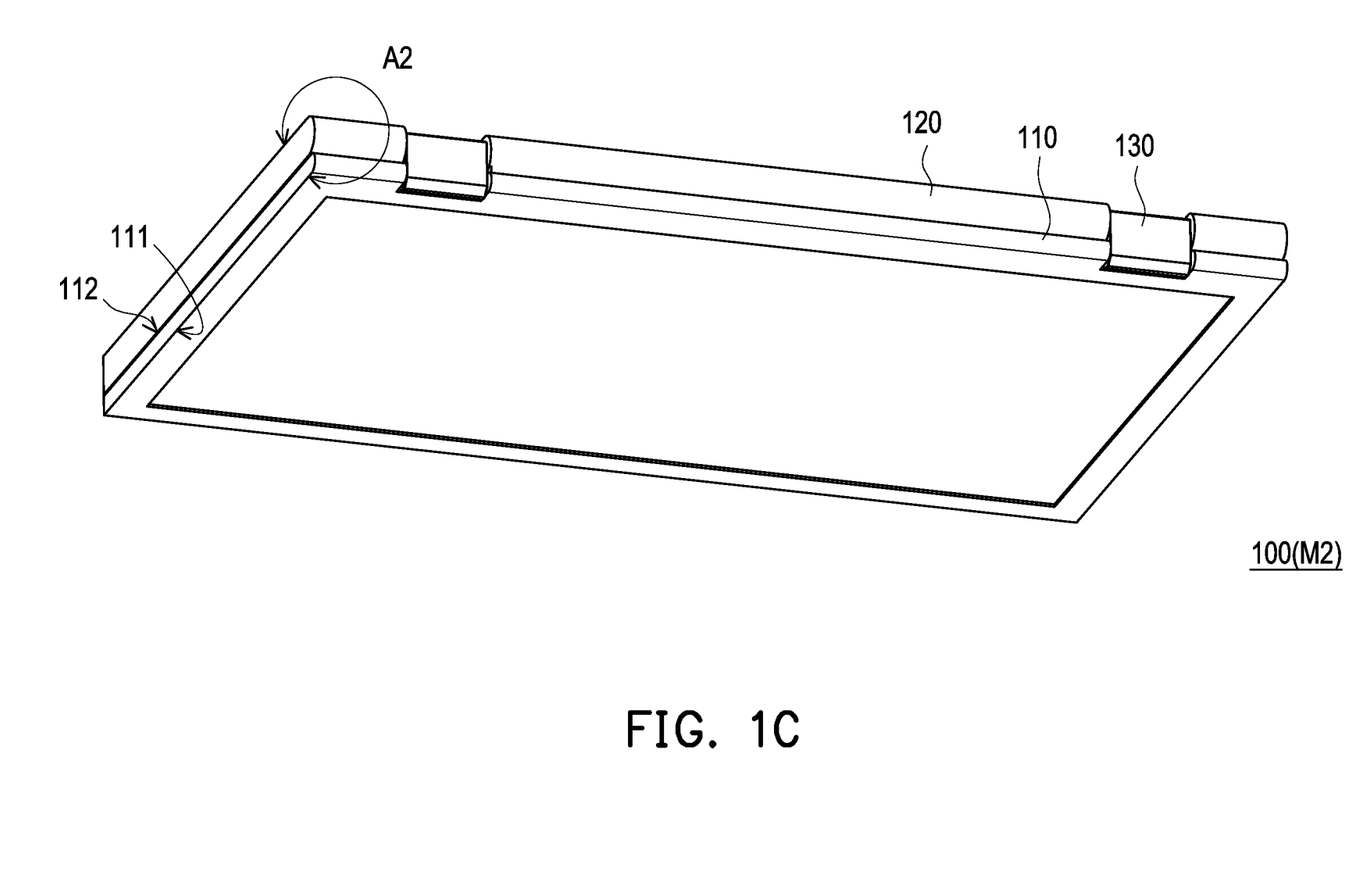

FIG. 1A to FIG. 1C are three-dimensional views of a foldable electronic device 100 in a folding mode M0, a drawing mode M1, and a tablet mode M2 of an embodiment of the disclosure.

Referring to FIG. 1A to FIG. 1C, the foldable electronic device 100 is, for example, a notebook computer. The foldable electronic device 100 is in the folding mode M0 (FIG. 1A) to facilitate carrying and storage, and the foldable electronic device 100 may also be in the unfolded state. In the unfolded state, the foldable electronic device is unfolded by a first angle A1 (e.g., 315 degrees) to be the drawing mode M1 (FIG. 1B), or unfolded to a second angle A2 (e.g., 360 degrees) to be the tablet mode M2 (FIG. 1C) according to the usage requirements.

The torque value of the foldable electronic device 100 unfolded from the first angle A1 to the second angle A2 is greater than the torque value of the foldable electronic device 100 unfolding from 0 degrees to the first angle A1 and the torque value of the foldable electronic device 100 closing from the second angle A2 to 0 degrees.

Figure 2A:
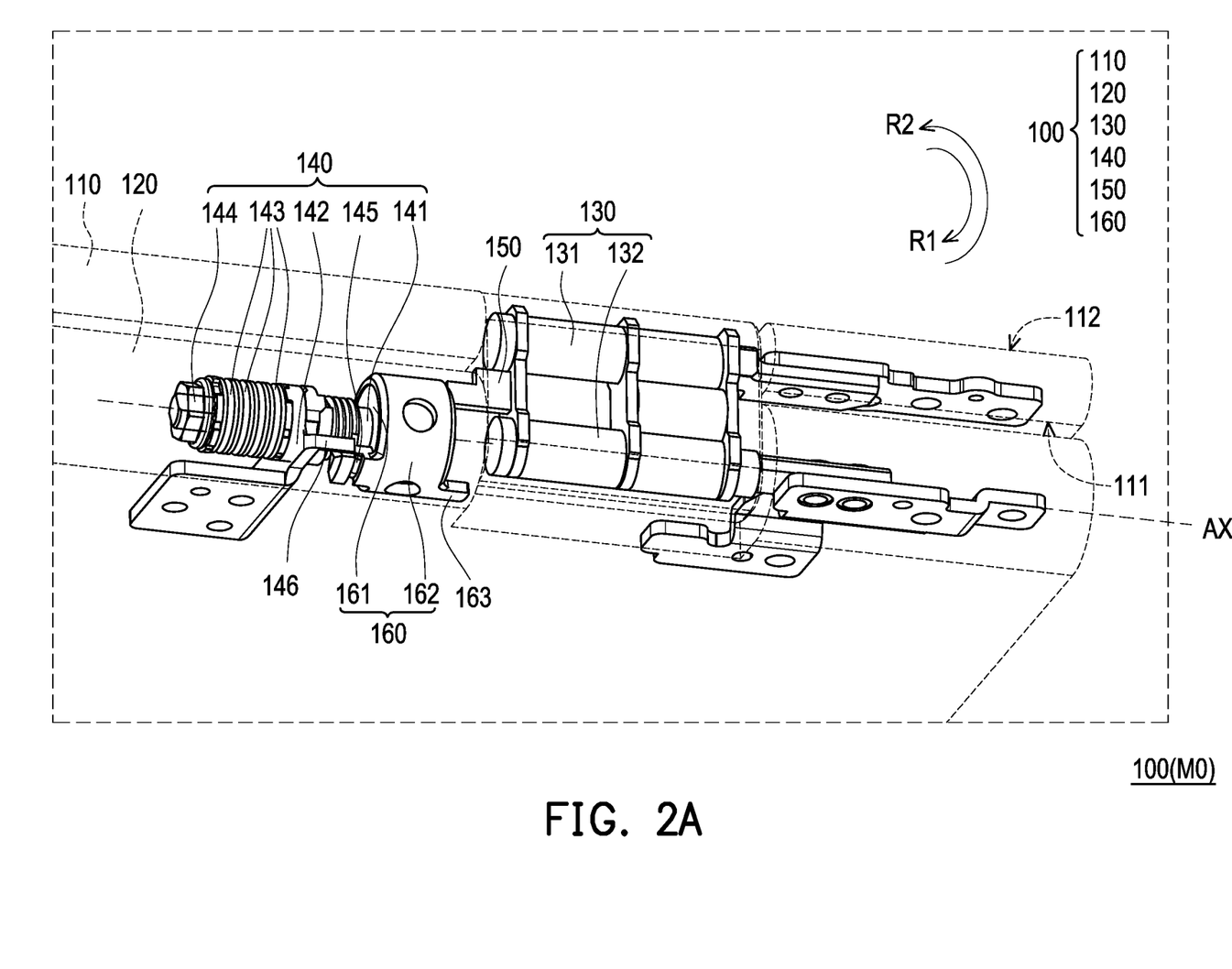
FIG. 2A is a partially enlarged perspective view of FIG. 1A.
Figure 2B:
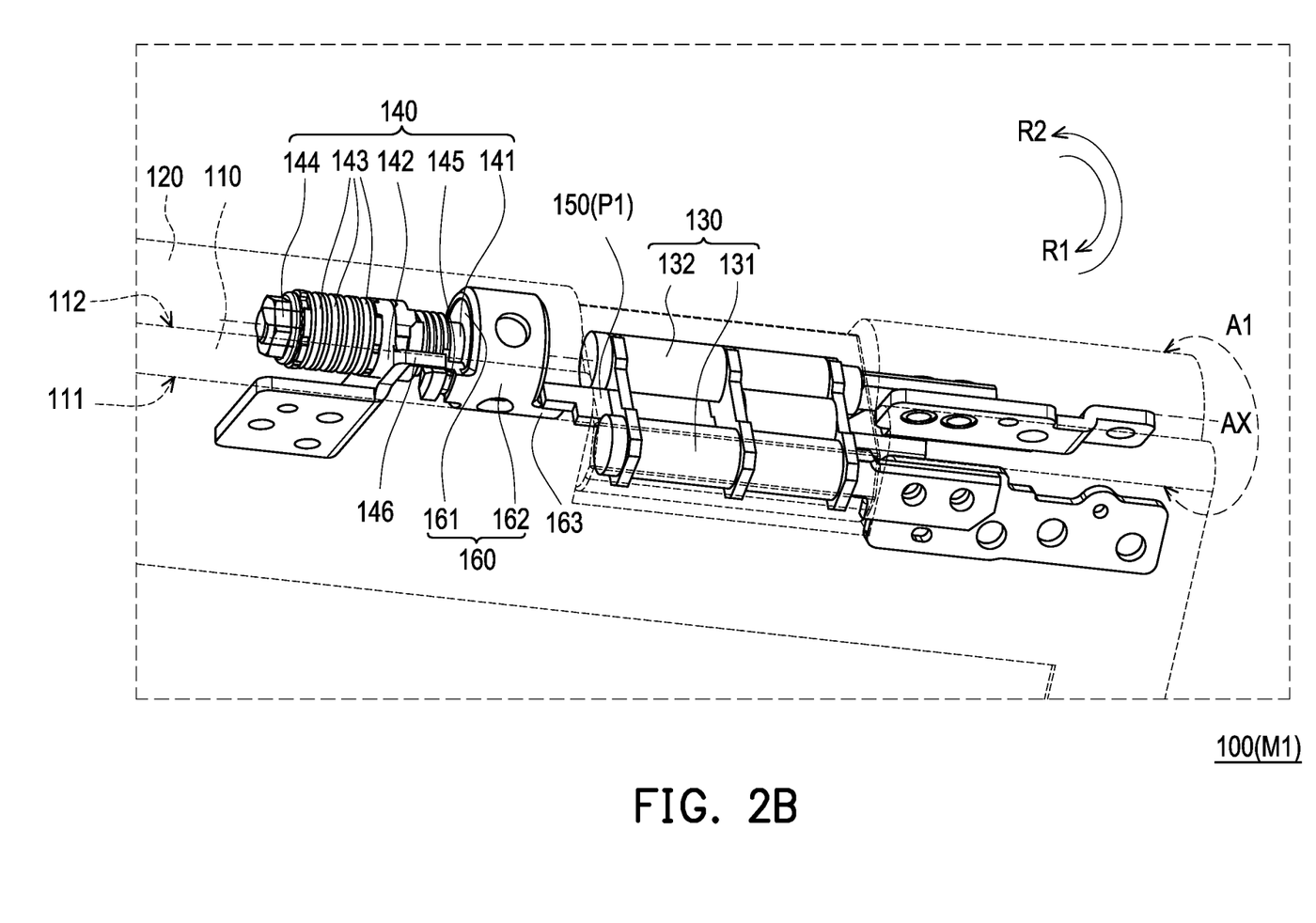
FIG. 2B is a partially enlarged perspective view of FIG. 1B.
Figure 2C:
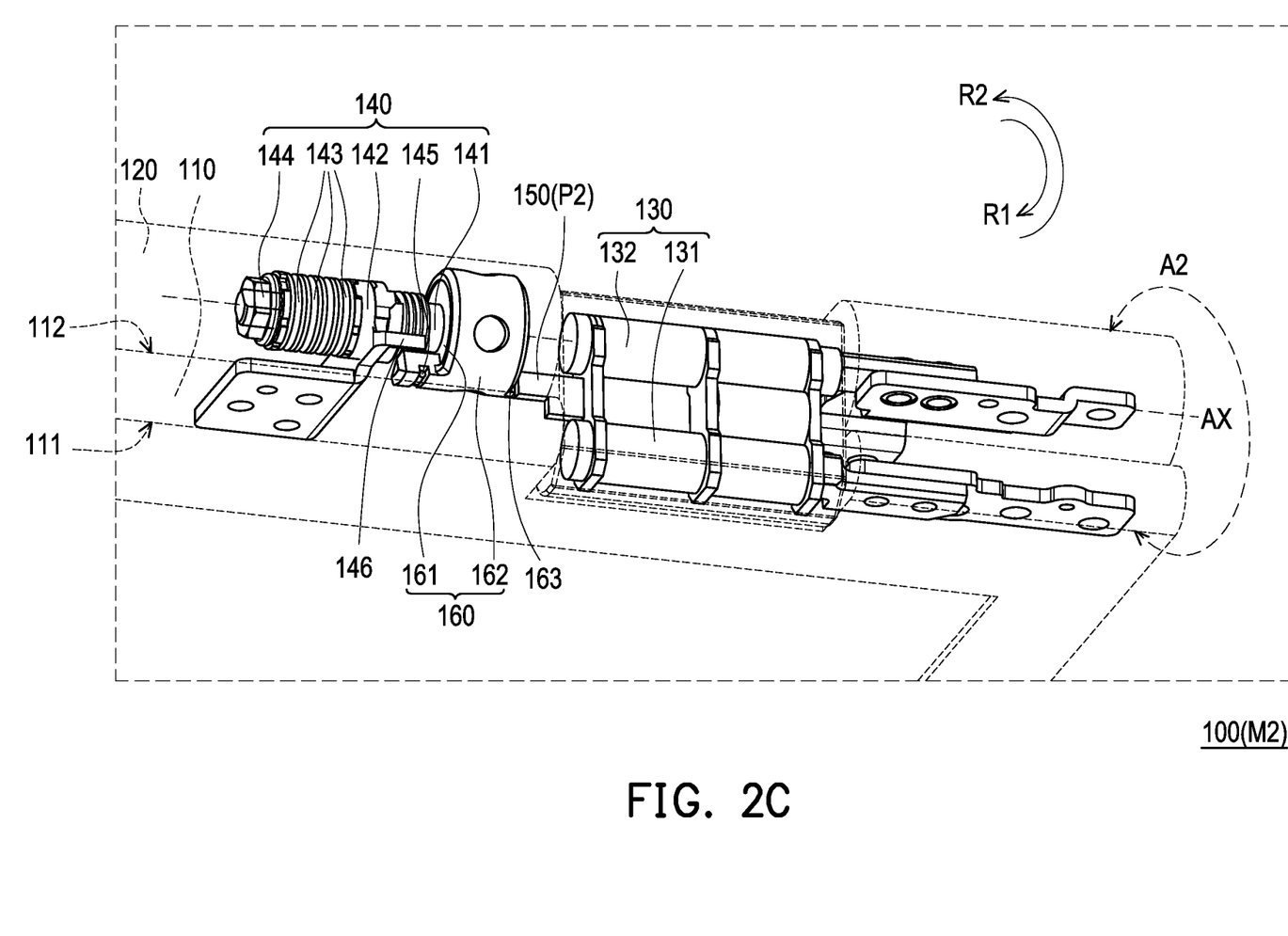
FIG. 2C is a partially enlarged perspective view of FIG. 1C.

Referring to FIG. 2A to FIG. 2C, the foldable electronic device 100 of the disclosure includes a first body 110, a second body 120, and a first hinge module 130. The first hinge module 130 is pivotally connected to the first body 110 and the second body 120, so that the first body 110 rotates 360 degrees relative to the second body 120 through the first hinge module 130.

In one embodiment, the first body 110 is, for example, a display body, and the second body 120 is, for example, a system body, but not limited thereto.

In one embodiment, the first hinge module 130 is, for example, a gear hinge, so that the first body 110 and the second body 120 rotates synchronously with respect to each other, but not limited thereto. In other embodiments, the first hinge module 130 is a switch hinge, which achieves multi-stage rotation by means of alternating rotation, but is not limited thereto.

In one embodiment, the first body 110 has a display surface 111 and a back surface 112 opposite to each other. In the folding mode M0 (FIG. 1A), the display surface 111 is located between the second body 120 and the back surface 112, while in the drawing mode M1 (FIG. 1B) or the tablet mode M2 (FIG. 1C), the back surface 112 is located between the second body 120 and the display surface 111, but not limited thereto.

In one embodiment, as shown in FIG. 1A, the rotation direction of the first body 110 unfolding relative to the second body 120 is the first rotation direction R1, and the rotation direction of the first body 110 closing relative to the second body 120 is the second rotation direction R2, but not limited thereto.

Referring to FIG. 2A to FIG. 2C, the first hinge module 130 has a first shaft 131 and a second shaft 132. The first shaft 131 is pivotally connected to the first body 110. The second shaft 132 is pivotally connected to the second body 120, and the second shaft 132 has a virtual axis AX.

Referring to FIG. 2A to FIG. 2C, the foldable electronic device 100 of the disclosure further includes a second hinge module 140, a driving sheet 150, and a one-way bearing 160. The second hinge module 140 is disposed on the second body 120 and has a rotating shaft 141, and the rotating shaft 141 is disposed corresponding to the virtual axis AX. The driving sheet 150 is located between the first shaft 131 and the second shaft 132, is located between the first hinge module 130 and the second hinge module 140, and rotates together with the first body 110 around the virtual axis AX. The one-way bearing 160 is rotatably disposed around the rotating shaft 141 and has a bearing stop portion 163 corresponding to the driving sheet 150.

Referring to FIG. 2A to FIG. 4, the second hinge module 140 includes a fixing member 142, multiple torque members 143, a locking attachment 144, and an elastic member 145. The fixing member 142 is connected to the second body 120, and disposed around the rotating shaft 141. The torque members 143 are disposed around the rotating shaft 141. The locking attachment 144 is locked to the rotating shaft 141 to sandwich the torque members 143 between the fixing member 142 and the locking attachment 144. In this way, when the rotating shaft 141 rotates relative to the fixing member 142 disposed on the second body 120, the second hinge module 140 generates torque.

In one embodiment, the torque value provided by the second hinge module 140 is, for example, 0.7 times the torque value provided by the first hinge module 130, but not limited thereto.

Figure 3:
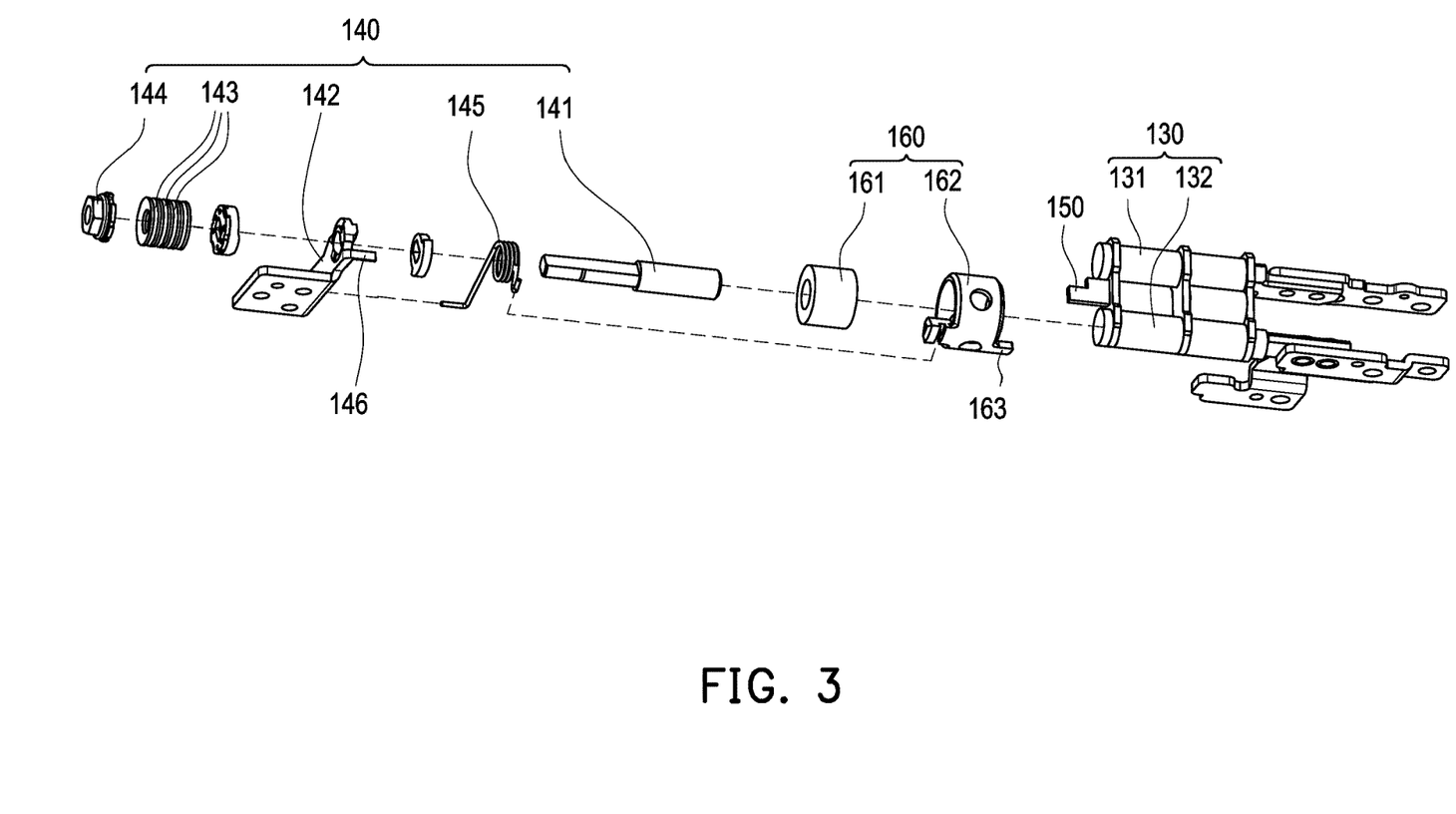
FIG. 3 is a partial component exploded view of the first hinge module, the second hinge module, the driving sheet, and the one-way bearing of FIG. 2A.
Figure 4:
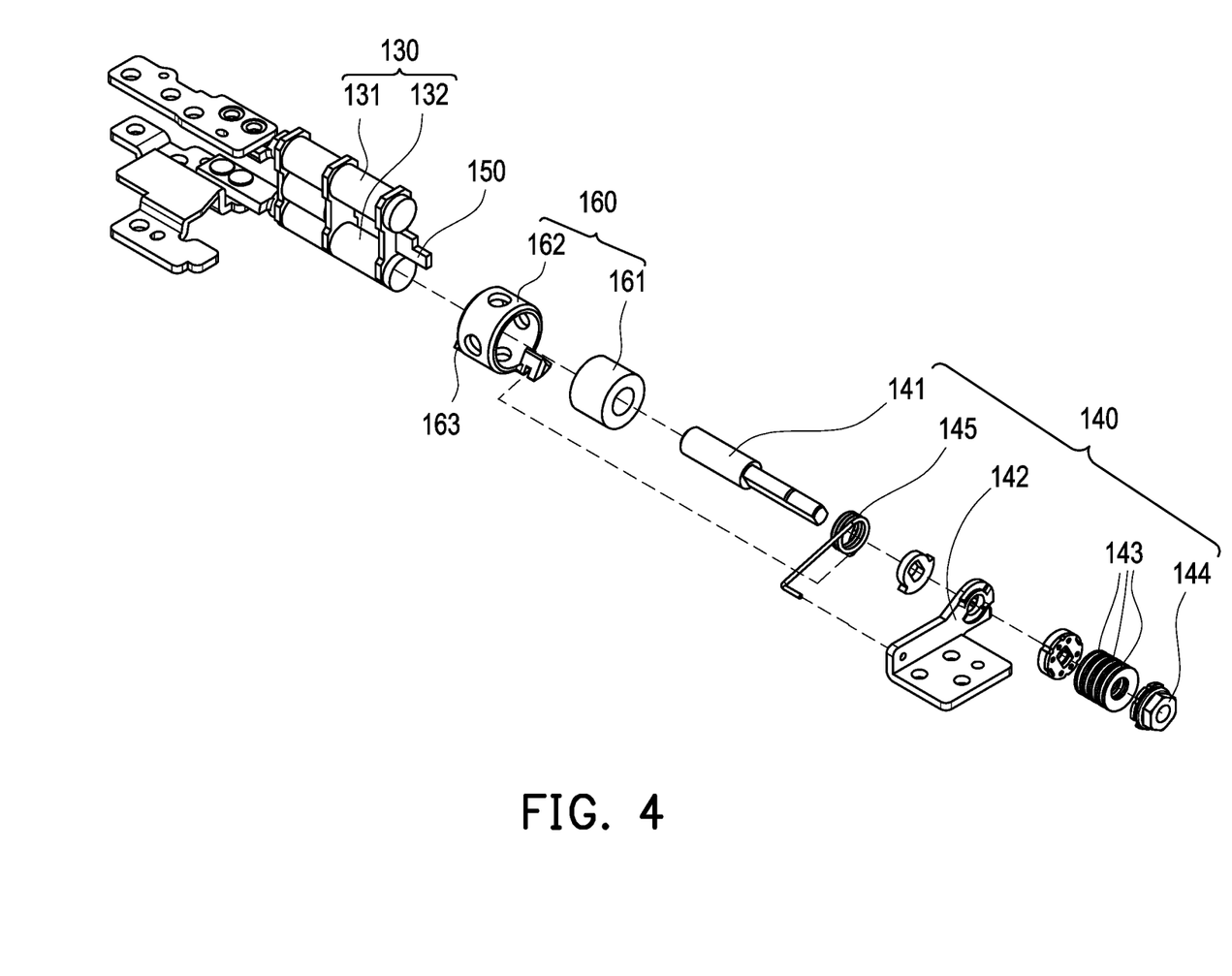
FIG. 4 is a partial component exploded view of FIG. 3 from another perspective.

Referring to FIG. 3 and FIG. 4, the elastic member 145 is connected between the fixing member 142 and the one-way bearing 160, and the fixing member 142 has a hinge stop portion 146 (FIG. 3) corresponding to the one-way bearing 160, so that the elastic member 145 applies returning force to the one-way bearing 160, and when the one-way bearing 160 is rotated in the second rotation direction R2 relative to the rotating shaft 141, the one-way bearing 160 may come into contact with the hinge stop portion 146 and stop the rotation (FIG. 2B).

In this way, through the structural design of the elastic member 145 and the hinge stop portion 146, the one-way bearing 160 rotates to the position where it contacts the hinge stop portion 146 (FIG. 2B) along the second rotation direction R2 is the same as the position where the driving sheet 150 rotates to the first position P1 along the first rotation direction R1 and contacts the bearing stop portion 163 (FIG. 2B), so that the one-way bearing 160 is smoothly returned to the original position (i.e., the position in contact with the driving sheet 150 at the first position P1).

Referring to FIG. 2A to FIG. 4, the one-way bearing 160 includes an inner ring member 161 and an outer ring member 162. The inner ring member 161 is disposed around the rotating shaft 141, the outer ring member 162 is disposed around the inner ring member 161, and the outer ring member 162 has bearing stop portion 163.

The outer ring member 162 is combined with the inner ring member 161 by means of, for example, interference-fitting, adhesive bonding, screw locking, etc., so that the outer ring member 162 is tightly fitted to the inner ring member 161 in the first rotation direction R1, and the outer ring member 162 rotates relative to the inner ring member 161 in the second rotation direction R2, but not limited thereto.

In this way, through the structural design of the driving sheet 150 and the one-way bearing 160, the driving sheet 150 may only drive the one-way bearing 160 and the rotating shaft 141 together to rotate along the first rotation direction R1 under the contact with the bearing stop portion 163 (i.e., the driving sheet 150 rotates from the first position P1 in FIG. 2B to the second position P2 in FIG. 2C), such that the second hinge module 140 may only provide another torque when the first body 110 relative to the second body 120 is in a specific rotation direction and a specific unfolding angle range.

That is, as shown in FIG. 1A and FIG. 2A, before the first body 110 is unfolded to the first angle A1 (FIG. 2B) relative to the second body 120 along the first rotation direction R1, the driving sheet 150 has not yet rotated to the first position P1 (FIG. 2B) and is not in contact with the bearing stop portion 163, therefore the second hinge module 140 cannot be driven to generate torque. In other words, during the transition from the folding mode M0 to the drawing mode M1, the torque of the foldable electronic device 100 is only provided by the first hinge module 130.

Next, as shown in FIG. 1B and FIG. 2B, when the first body 110 is unfolded to the first angle A1 relative to the second body 120 along the first rotation direction R1 and is in the drawing mode M1, the driving sheet 150 is simultaneously driven to rotate to the first position P1 to contact the bearing stop portion 163.

Afterwards, as shown in FIG. 1B, FIG. 1C, FIG. 2B, and FIG. 2C, if the user applies a force to the display surface 111 of the first body 110, the first body 110 is driven to rotate along the first rotation direction R1, such that the driving sheet 150 simultaneously drives the one-way bearing 160 and the rotating shaft 141 together to rotate relative to the second body 120 along the first rotation direction R1 to generate a torque, so that the back surface 112 faces the second body 120. Therefore, during the transition from the drawing mode M1 to the tablet mode M2, the torque of the foldable electronic device 100 is jointly provided by the first hinge module 130 and the second hinge module 140.

Finally, as shown in FIG. 1A to FIG. 2C, when the operation mode of the foldable electronic device 100 is to be adjusted, the first body 110 is closed from the second angle A2 (FIG. 2C) relative to the second body 120 along the second rotation direction R2, such that the driving sheet 150 is driven together to rotate along the second rotation direction R2.

At this time, the elastic member 145 applies the returning force to the one-way bearing 160 simultaneously, so that the outer ring member 162 of the one-way bearing 160 rotates from the second position P2 (FIG. 2C) relative to the rotating shaft 141 in the second rotation direction R2, such that the rotating shaft 141 cannot be driven to rotate together to generate torque. Until the driving sheet 150 rotates and returns to the first position P1 (FIG. 2B), and the one-way bearing 160 contacts the hinge stop portion 146 (FIG. 2B) and stops rotating simultaneously, the driving sheet 150 is separated from the bearing stop portion 163 (FIG. 2A).

Therefore, during the transition from the tablet mode M2, through the drawing mode M1, to the folding mode M0, the torque of the foldable electronic device 100 is only provided by the first hinge module 130.

In this way, through the structural design of the second hinge module 140, the driving sheet 150, and the one-way bearing 160, the second hinge module 140 may only provide another torque after the first body 110 rotates relative to the second body 120 along the first rotation direction R1 and is unfolded to the first angle A1 (between the drawing mode M1 and the tablet mode M2). Therefore, the foldable electronic device supports the force of the hand drawing and writing via touch control (i.e., the external force applied to the display surface 111 of the first body 110 along the first rotation direction R1), and prevents the user from having a difficult time in flipping the electronic device in other modes caused by the increase of the torque value.

To sum up, in the foldable electronic device of this disclosure, the first body is rotated 360 degrees relative to the second body through the first hinge module, and through the structural design of the second hinge module, the driving sheet, and the one-way bearing, such that the second hinge module in the drawing mode provides additional torque only after the first body rotates relative to the second body along the first rotation direction and unfolds to a first angle (i.e., the driving sheet rotates to the first position along the first rotation direction to contact the bearing stop portion). Therefore, in the drawing mode, the foldable electronic device supports the force of the hand drawing and writing via touch control applied along the first rotation direction, and prevents the user from feeling difficulty in flipping the electronic device in other modes caused by the increase of the torque value.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A foldable electronic device, comprising:
a first body, having a display surface and a back surface;
a second body;
a first hinge module, having a first shaft and a second shaft, wherein the first shaft is pivotally connected to the first body, the second shaft is pivotally connected to the second body, and the second shaft has a virtual axis;
a second hinge module, disposed on the second body and having a rotating shaft, wherein the rotating shaft is disposed corresponding to the virtual axis;
a driving sheet, located between the first shaft and the second shaft, wherein the driving sheet is located between the first hinge module and the second hinge module; and
a one-way bearing, rotatably disposed around the rotating shaft and having a bearing stop portion corresponding to the driving sheet;
wherein when the first body is flipped relative to the second body, the driving sheet rotates to a first position along a first rotation direction and contacts the bearing stop portion, and the one-way bearing and the rotating shaft are driven to rotate simultaneously relative to the second body, so that the back surface faces the second body,
wherein the second hinge module further comprises:
a fixing member, connected to the second body and disposed around the rotating shaft;
a plurality of torque members, disposed around the rotating shaft; and
a locking attachment, locked to the rotating shaft to sandwich the torque members between the fixing member and the locking attachment.

2. The foldable electronic device according to claim 1, wherein when the one-way bearing and the rotating shaft rotate simultaneously relative to the second body along the first rotation direction, a torque is generated, and the one-way bearing rotates relative to the rotating shaft along a second rotating direction opposite to the first rotating direction until the driving sheet returns to the first position.

3. The foldable electronic device according to claim 1, wherein the second hinge module further comprises an elastic member connected between the fixing member and the one-way bearing.

4. The foldable electronic device according to claim 1, wherein the fixing member has a hinge stop portion corresponding to the one-way bearing, the one-way bearing rotates relative to the rotating shaft in a second rotation direction opposite to the first rotation direction until the one-way bearing stops rotating after contacting the hinge stop portion.

5. The foldable electronic device according to claim 1, wherein the one-way bearing comprises an inner ring member and an outer ring member, the inner ring member is disposed around the rotating shaft, the outer ring member is disposed around the inner ring member, and the outer ring member has the bearing stop portion.

6. The foldable electronic device according to claim 5, wherein the outer ring member is tightly fitted to the inner ring member in the first rotation direction, and the outer ring member rotates relative to the inner ring member in a second rotation direction opposite to the first rotation direction.

7. The foldable electronic device according to claim 1, wherein the first body rotates 360 degrees relative to the second body through the first hinge module.

8. The foldable electronic device according to claim 1, wherein the first body rotates relative to the second body along the first rotation direction and unfolds to a first angle, such that the driving sheet is driven to rotate to the first position, and the back surface is located between the second body and the display surface.

* * * * *